US007389119B2

(12) United States Patent
Weigele

(10) Patent No.: US 7,389,119 B2
(45) Date of Patent: Jun. 17, 2008

(54) METHODS AND APPARATUS FOR PERFORMING A SUBSCRIBER IDENTITY MODULE (SIM) INITIALIZATION PROCEDURE

(75) Inventor: Ingo W. Weigele, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 592 days.

(21) Appl. No.: 10/903,555

(22) Filed: Jul. 30, 2004

(65) Prior Publication Data

US 2005/0070321 A1    Mar. 31, 2005

(30) Foreign Application Priority Data

Aug. 1, 2003  (EP)  ................... 03254837

(51) Int. Cl.
*H04B 7/00*   (2006.01)
*H04B 1/38*   (2006.01)
*H04Q 7/20*   (2006.01)
*H04J 3/24*   (2006.01)

(52) U.S. Cl. .................. 455/517; 455/558; 370/349
(58) Field of Classification Search ............ 455/558, 455/517; 370/349
See application file for complete search history.

(56) References Cited

U.S. PATENT DOCUMENTS 6,097,967 A * 8/2000 Hubbe et al. ............ 455/558
6,353,620 B1 * 3/2002 Sallberg et al. ............ 370/465
6,745,048 B2 * 6/2004 Vargas et al. ............ 455/558
6,850,777 B1 * 2/2005 Estes et al. ............. 455/558
2007/0060200 A1 * 3/2007 Boris et al. ............. 455/558

OTHER PUBLICATIONS

"ETSI TS 101 267 v8.3.0.", "Digital Cellular telecommuincations system (Phase 2 +) Specification of the SIM application toolkit for the subscriber Identity module—Mobile equipment", Aug. 2000, pp. 1, 16-19.
"ETSI TS 101 267 v7.5.0", "Digital Cellular telecommuincations system (Phase 2 +) Specification of the SIM application toolkit for the subscriber Identity module—Mobile equipment", Aug. 2000, pp. 1, 14-16.
"ETSI TS 100 977 v8.3.0.", "Digital Cellular telecommuincations system (Phase 2 +) Specification of the SIM application toolkit for the subscriber Identity module—Mobile equipment", Aug. 2000, pp. 1, 69-70.
"European Seach Report for Application # 03254837.2", May 12, 2003.

* cited by examiner

*Primary Examiner*—Lana Le
*Assistant Examiner*—Bobbak Safaipour
(74) *Attorney, Agent, or Firm*—John J. Oskorep, Esq.

(57) ABSTRACT

Methods and apparatus for performing a Subscriber Identity Module (SIM) initialization procedure are described. A terminal profile having a most recent release version format is communicated to a Subscriber Identity Module (SIM). An error from the SIM is detected in response to sending the most recent release version format of the terminal profile, since the SIM is incompatible with this most recent release version. Subsequently, a terminal profile having a previous release version format is communicated to the SIM based on detecting the error from the SIM. This may be repeated further until compatibility between the mobile communication device and the SIM is established.

20 Claims, 4 Drawing Sheets

METHODS AND APPARATUS FOR PERFORMING A SUBSCRIBER IDENTITY MODULE (SIM) INITIALIZATION PROCEDURE

CROSS-REFERENCE TO RELATED APPLICATION

This application claims priority to European Patent Application No. 03254837.2 entitled "Methods And Apparatus For Performing A Subscriber Identity Module (SIM) Initialization Procedure" having a filing date of 1 Aug. 2003, which is hereby incorporated by reference herein.

BACKGROUND

1. Field of the Invention

The present invention relates generally to mobile communication equipment and subscriber identity modules (SIMs) used in connection therewith, and more particularly to methods and apparatus for performing SIM initialization procedures with SIMs.

2. Description of the Related Art

Global System for Mobile communications (GSM) is a globally-accepted standard for digital cellular communication using mobile stations. Like most wireless technology standards, GSM standards are documented in specifications or "specs". GSM specs originally began in committee "GSM" of CEPT (Conference of European Posts and Telecommunications). As CEPT Recommendations, they were allocated a reference number of the form "nn.nn" (for example, "GSM 06.12"). The GSM community (i.e. the Technical Committee "Special Mobile Group" or SMG) continues to use these specification identifiers even after transfer to the European Telecommunication Standards Institute (ETSI).

GSM specifications are typically grouped into "releases". Nearly all of the specifications for all releases are published as ETSI deliverables and most have undergone several revisions in each release. The initial specifications were published by ETSI in 1994 and are now referred to as "Phase 1". The next release was known as "Phase 2", and the following one as "Phase 2+". Within Phase 2+, there have been annual releases since 1996, which are known as R96, R97, R98, and R99.

One important component in GSM is a Subscriber Identity Module or "SIM" card which is inserted into mobile equipment for its operation. A SIM is a small and thin card which contains a small chip (i.e. processor and memory) which communicates with mobile equipment. A SIM stores important parameters, such as an International Mobile Subscriber Identity (IMSI), to uniquely identify an end user or subscriber of the mobile equipment. A SIM may store user information for the subscriber as well, including datebook (or calendar) information, recent call information, short message service (SMS) messages, among other data items. In addition, the processor on the SIM typically includes a set of applications and related procedures used during a GSM session, referred to as a SIM Application Toolkit. One advantage of using a SIM is that subscribers are not necessarily bound by any single physical mobile terminal, as they may carry personalized information with them for use with other terminals.

Prior to operation, a SIM initialization procedure must be performed between the mobile terminal and the SIM. A conventional SIM initialization procedure is specified in a GSM specification referred to as GSM 11.11 [14]. During conventional SIM initialization, the mobile equipment may attempt to send its terminal profile to the SIM. The terminal profile of the mobile equipment identifies to the SIM the facilities of the SIM Application Toolkit that are supported by the mobile equipment. That is, the terminal profile of the mobile equipment lets the SIM know what SIM-related features the mobile equipment is capable of so that the SIM can limit its instruction range accordingly.

However, the mobile equipment and the SIM may be manufactured in accordance with different versions or releases of the GSM specification. If so, the mobile equipment and the SIM may fail to operate together as intended. For example, the mobile equipment may be manufactured in accordance with R99, whereas the SIM may be manufactured in accordance with R98. One difference between R98 and R99 is that the terminal profile is 17 bytes in R99 but only 9 bytes in R98. In this case, the mobile equipment may receive an error from the SIM and invalidate it. Thus, the mobile equipment may fail to operate as intended even though these desirable features do indeed exist.

Accordingly, there is a resulting need for methods and apparatus for performing SIM initialization procedures that overcome such conventional deficiencies.

SUMMARY

Methods and apparatus for performing a Subscriber Identity Module (SIM) initialization procedure are described. A terminal profile having a most recent release version format is communicated to a Subscriber Identity Module (SIM). An error from the SIM is detected in response to sending the most recent release version format of the terminal profile, since the SIM is incompatible with this most recent release version. Subsequently, a terminal profile having a previous release version format is communicated to the SIM in response to detecting the error from the SIM. This may be repeated further until compatibility between the mobile communication device and the SIM is established.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Methods and apparatus for performing a Subscriber Identity Module (SIM) initialization procedure are described herein. A most recent release version format of a terminal profile of a mobile communication device is communicated to a Subscriber Identity Module (SIM). An error from the SIM is detected in response to sending the most recent release version format of the terminal profile if the SIM is incompatible with this most recent release version format. Subsequently, a previous release version of the terminal profile is communicated to the SIM in response to detecting the error from the SIM. This may be repeated further until compatibility between the mobile communication device and the SIM is established.

Figure 1:
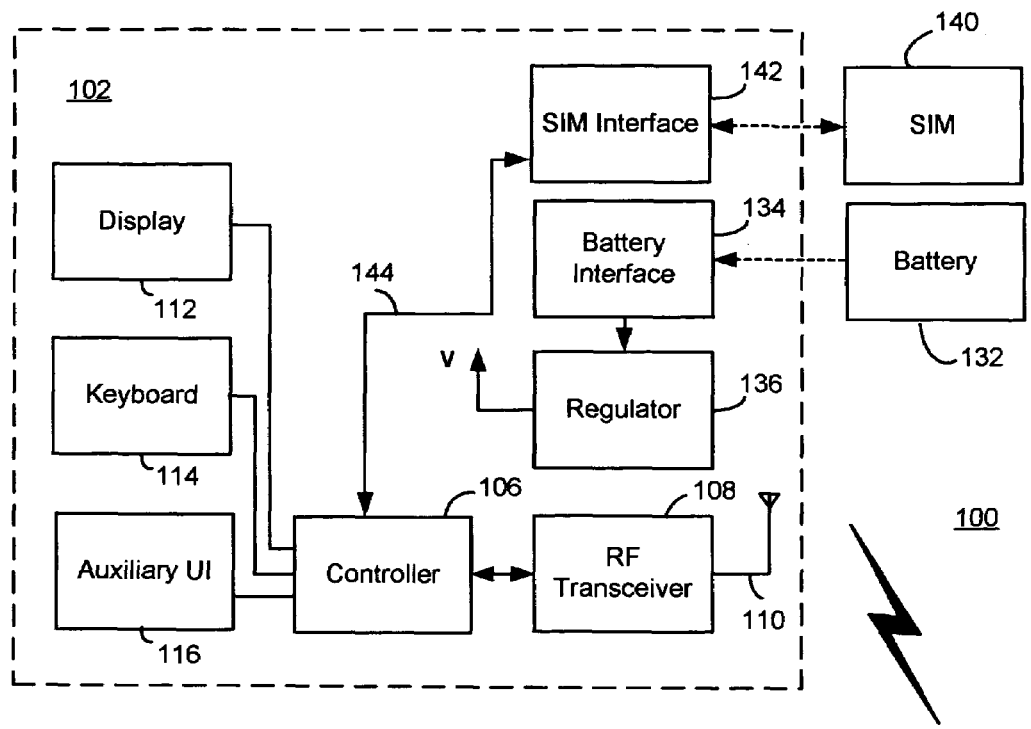
FIG. 1 is a block diagram which illustrates pertinent components of a mobile communication device which communicates within a wireless communication network.
Figure 1:
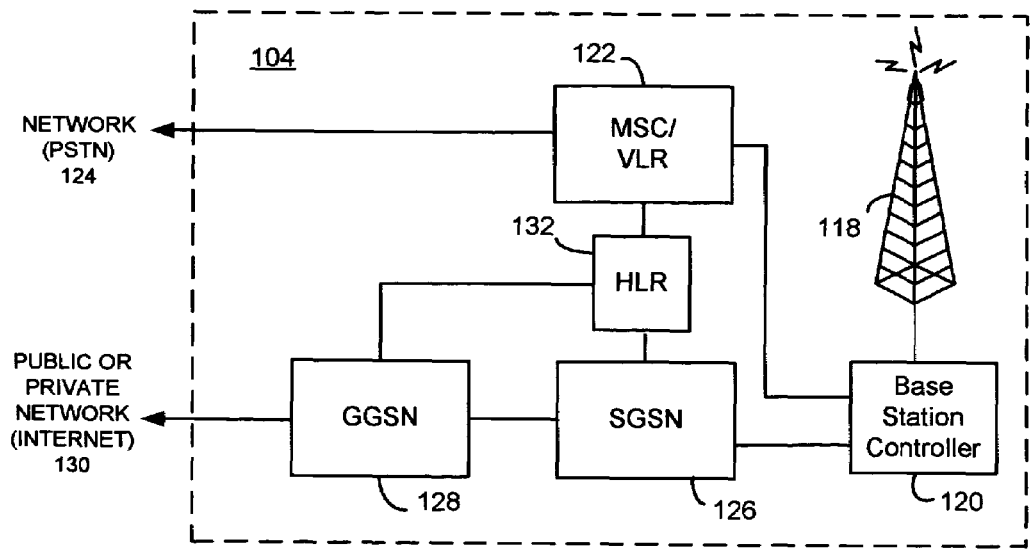

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and a base station controller 120, including for example modulation/demodulation and possibly encoding/decoding and encryption/decryption. It is also contemplated that RF transceiver circuitry 108 may perform certain functions in addition to those performed by base station controller 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 132 provides for a mechanical and electrical connection for battery 132. Battery interface 132 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information.

Since SIM 140 is coupled to SIM interface 142, it is coupled to controller 106 through communication lines 144. The processor on SIM 140 includes a set of applications and related procedures used during a GSM session, referred to as a SIM Application Toolkit. In order to identify the subscriber, SIM 140 contains some user parameters such as an International Mobile Subscriber Identity (IMSI). SIM 140 may store additional user information for the mobile station as well, including datebook (or calendar) information and recent call information. An advantage of using SIM 140 is that subscribers are not necessarily bound by any single physical mobile terminal, as they may carry personalized information with them for other terminals.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is configured in accordance with Global Systems for Mobile communications (GSM) and General Packet Radio Service (GPRS) technologies. Wireless network 104 includes a base station controller (BSC) 120 with an associated tower station 118, a Mobile Switching Center (MSC) 122, a Home Location Register (HLR) 132, a Serving GPRS Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 are together referred to herein as the fixed transceiver equipment. The fixed transceiver equipment provides wireless network coverage for a particular coverage area commonly referred to as a "cell". The fixed transceiver equipment transmits communication signals to and receives communication signals from mobile stations within its cell via station 118. The fixed transceiver equipment normally performs such functions as modulation and possibly encoding and/or encryption of signals to be transmitted to the mobile station in accordance with particular, usually predetermined, communication protocols and parameters, under control of its controller. The fixed transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the fixed transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Figure 2:
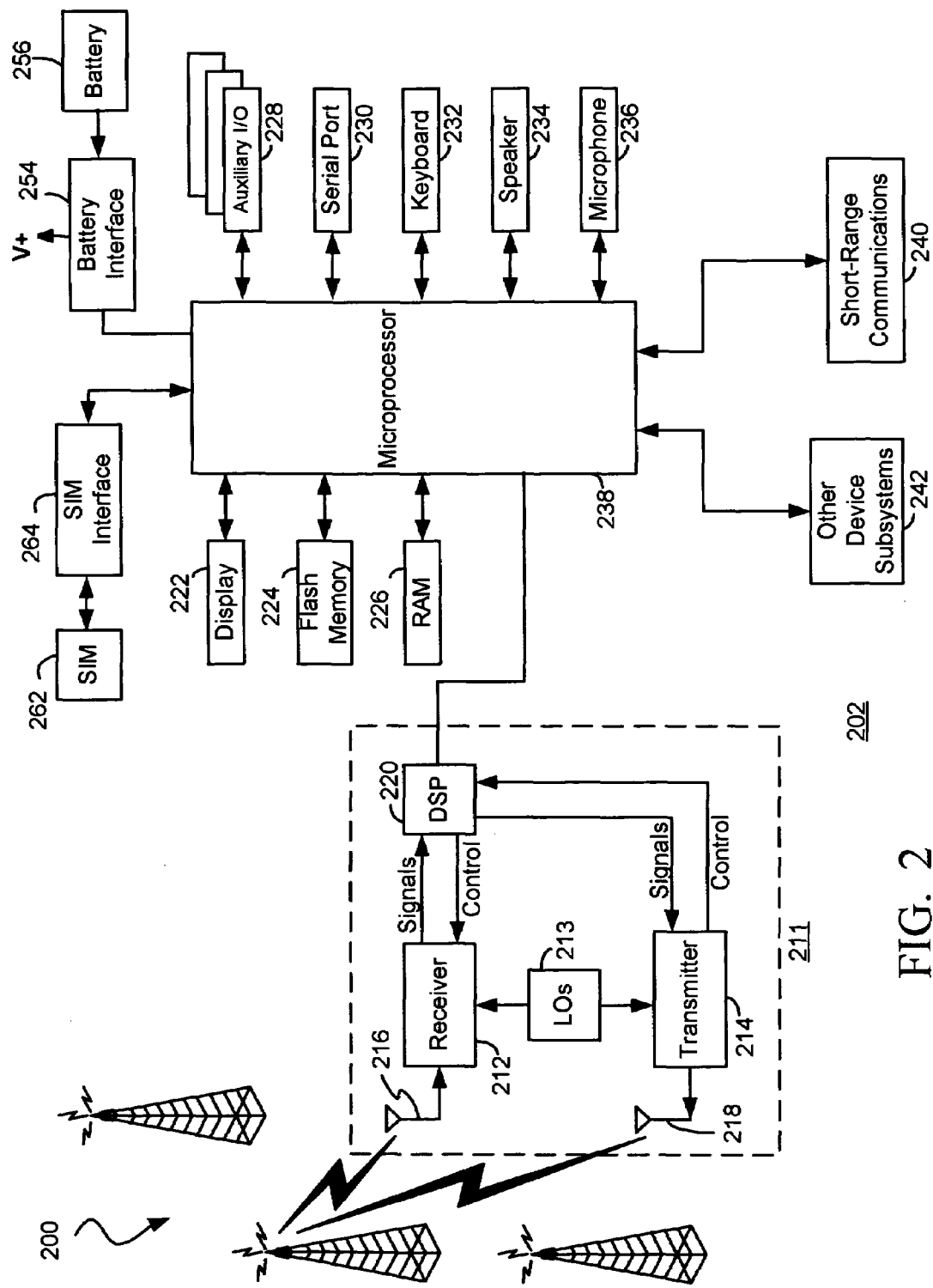
FIG. 2 is a more detailed diagram of a preferred mobile communication device of FIG. 1.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications (such as a network reestablishment scheme), will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228.

Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
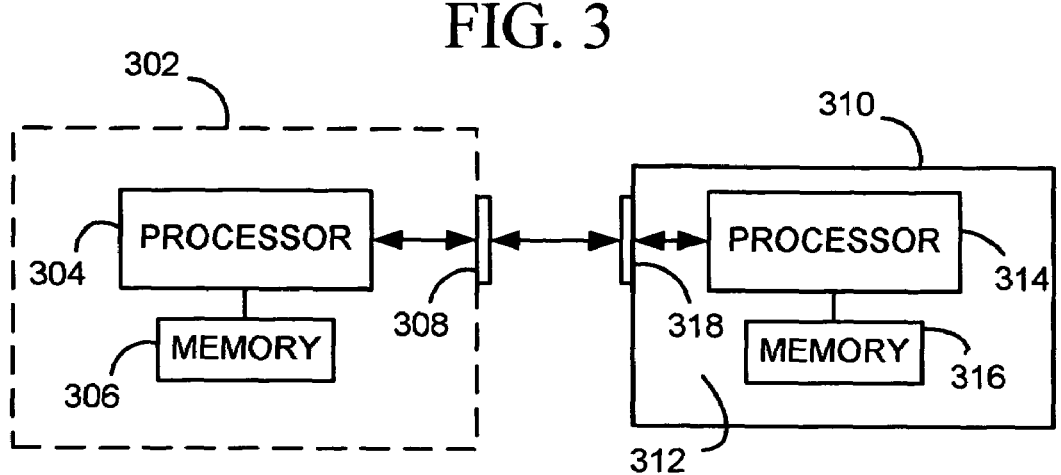
FIG. 3 is a block diagram of interfacing between a mobile communication device and a Subscriber Identity Module (SIM)

FIG. 3 is a block diagram of interfacing between a mobile communication device 302 and a Subscriber Identity Module (SIM) 310. Without SIM 310, mobile communication device 302 may be referred to as a "mobile terminal" or "mobile equipment" (ME). Mobile device 302 includes one or more processors 304 coupled to memory 306. Similarly, SIM 310 includes one or more processors 314 coupled to memory 316. Processor 314 and memory 316 of SIM 310 are carried on a card 312. Processor 314 of SIM 310 typically includes a set of applications and related procedures which may be used during a GSM session, referred to as a SIM Application Toolkit. Mobile device 302 has an interface 308 which is coupled to an interface 318 of SIM 310 when SIM 310 is inserted within mobile communication device 302. Once connected, processors 304 and 314 can communicate with each other.

Prior to use, however, a SIM initialization procedure must be performed between mobile device 302 and SIM 310. A conventional SIM initialization procedure is specified in a GSM specification referred to as GSM 11.11 [14]. During a conventional SIM initialization procedure, mobile device 302 may send its terminal profile to SIM 310. The terminal profile of mobile device 302 identifies the facilities of the SIM Application Toolkit of SIM 310 that are supported by mobile device 302. That is, the terminal profile of mobile device 302 lets SIM 310 know what features mobile device 302 is capable of so that SIM 310 can limit its instruction range accordingly. If no terminal download is specified, SIM 310 assumes that mobile device 302 does not support the specific SIM Application Toolkit of SIM 310.

Figure 4:
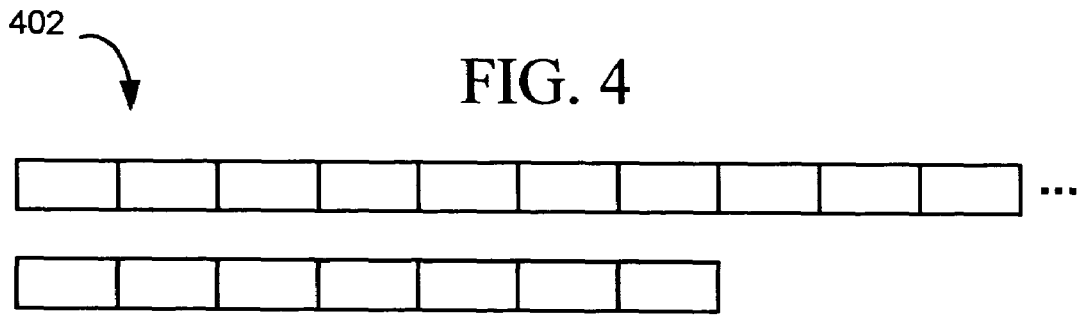
FIGS. 4-6 are illustrations of different message formats of different versions of terminal profiles of the mobile communication device (R99, R98, and R97, respectively)
Figure 5:
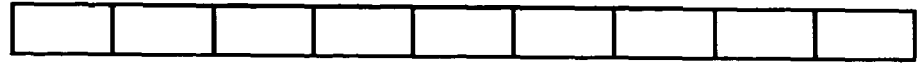
Figure 6:
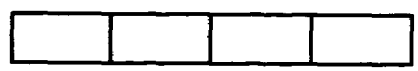

FIGS. 4-6 are illustrations of message formats of different versions of terminal profiles which a mobile communication device may utilize. More particularly, FIG. 4 is an illustration of a message format of a terminal profile 402 which is consistent with release version "R99". As shown in FIG. 4, terminal profile 402 has a message length of 17 bytes. On the other hand, FIG. 5 is an illustration of a message format of a terminal profile 502 which is consistent with version "R98". As shown in FIG. 5, terminal profile 502 has a message length of 9 bytes. Finally, FIG. 6 is an illustration of a message format of a terminal profile 602 which is consistent with version "R97". As shown in FIG. 6, terminal profile 602 has a message length of 4 bytes.

GSM specifications were originally started in committee "GSM" of CEPT (Conference of European Posts and Telecommunications). As CEPT Recommendations, they were allocated a reference number of the form "nn.nn" (for example, "GSM 06.12"). The GSM community (i.e. the Technical Committee "Special Mobile Group" or SMG) continue to use these specification identifiers even after transfer to the European Telecommunication Standards Institute (ETSI). GSM specifications are grouped into "releases". Nearly all of the specifications for all releases are published as ETSI deliverables, and most have undergone several revisions in each release. The initial specifications were published by ETSI in 1994 and are now known as "Phase 1". The next release was known as "Phase 2", and the following one as "Phase 2+". Within Phase 2+, there have been annual releases since 1996, which are known as R96, R97, R98 and R99. By examining a specification, one can tell which release it belongs to by version number:

TABLE 1

Association of GSM version number with GSM phase and/or release.

| Version | Phase and/or Release |
|---|---|
| 3.x.x | Phase 1 |
| 4.x.x | Phase 2 |
| 5.x.x | Phase 2+, R96 |
| 6.x.x | Phase 2+, R97 |
| 7.x.x | Phase 2+, R98 |
| 8.x.x | Phase 2+, R99 |

There may or may not be a release named "Release 2000", since the work has been subsumed by Third Generation specifications under the Third Generation Partnership Project (3GPP).

The R99 version of terminal profile 402 represented in FIG. 4 is the most recent release version to date, and has a different message format than that of terminal profiles 502 and 602 of FIGS. 5 and 6, respectively. As apparent, terminal profile 402 of FIG. 4 may not be supported by or compatible with all SIMs. The R98 version of terminal profile 502 represented in FIG. 5 is the next latest version, and has a different message format than that of terminal profile 602 of FIG. 6. As apparent, even terminal profile 502 of FIG. 5 may not be supported by or compatible with all SIMs. Thus, without employing special methods and apparatus, some mobile communication devices and SIMs may be incompatible with one other.

Figure 7:
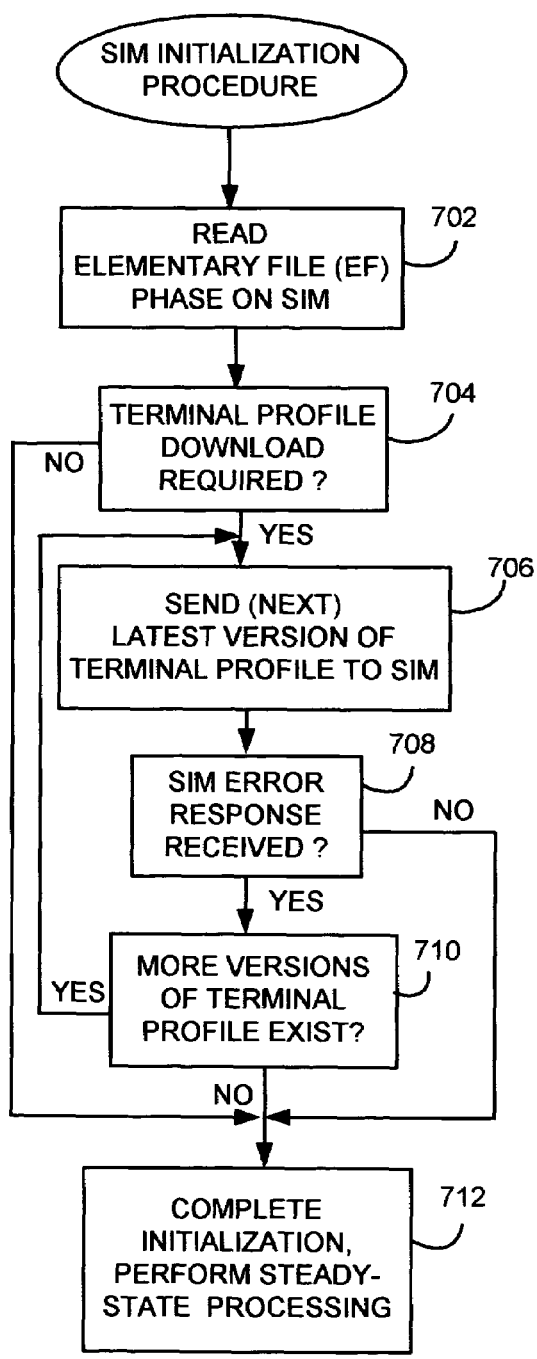
FIGS. 7-8 are flowcharts of methods of performing SIM initialization procedures of the present application.
Figure 8:
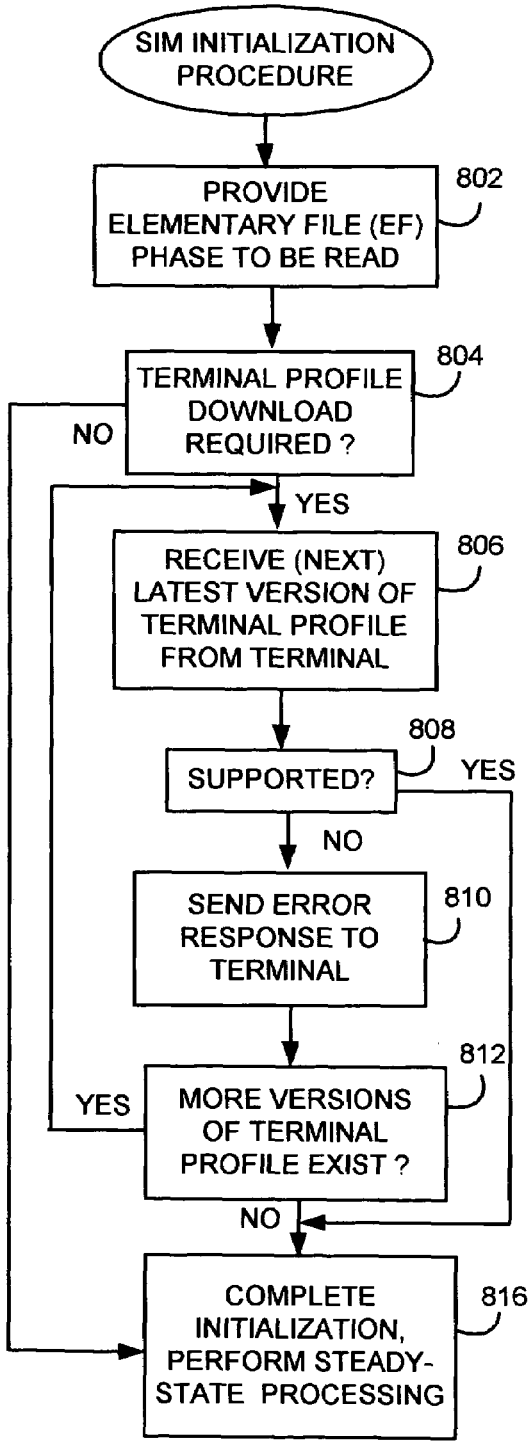

FIGS. 7 and 8 are flowcharts which describe methods of performing Subscriber Identify Module (SIM) initialization procedures of the present application. The flowchart of FIG. 7 pertains to mobile equipment (ME) operation during the SIM initialization procedure, and the flowchart of FIG. 8 pertains to SIM operation during the SIM initialization procedure. All communication steps between the mobile device and SIM are performed through their respective SIM interfaces.

The method associated with the flowchart of FIG. 7 is now described (ME perspective). In FIG. 7, a mobile communication device reads an Elementary File (EF) Phase on the SIM (step 702). If the terminal profile download is not required as indicated in the EF Phase at step 704, the mobile device completes initialization and performs steady-state processing (step 712). If a terminal profile download is required as indicated in the EF Phase at step 704, the mobile device sends its terminal profile in the latest release version format to the SIM (step 706). This latest release version format of the terminal profile may be version R99 (e.g. FIG. 4). If no SIM error is received from the SIM from sending the latest release version format at step 708, the mobile device completes initialization and performs steady-state processing (step 712).

On the other hand, if a SIM error is received from the SIM from sending the latest release version format at step 708, the mobile device identifies whether any previous release version formats of the terminal profile exist (step 710). If no previous release version formats of the terminal profile exist, the mobile device completes initialization and performs steady-state processing (step 712). On the other hand, if a previous release version format of the terminal profile does exist at step 710, the mobile device sends its terminal profile in the previous release version format to the SIM (step 706). This previous release version format may be version R98 (e.g. FIG. 5). If no SIM error is received from the SIM from sending the previous release version format at step 708, the mobile device completes initialization and performs steady-state processing (step 712).

On the other hand, if a SIM error is received from the SIM from sending the previous release version format at step 708, the mobile device identifies whether any other previous release version formats of the terminal profile exist (step 710). If no other previous release version formats of the terminal profile exist, the mobile device completes initialization and performs steady-state processing (step 712). On the other hand, if another previous release version format of the terminal profile exists at step 710, the mobile device sends its terminal profile in the other previous release version format to the SIM (step 706). This other previous release version format may be version R97 (e.g. FIG. 6). If no SIM error is received from the SIM from sending the other previous release version format at step 708, the mobile device completes initialization and performs steady-state processing (step 712). On the other hand, if a SIM error is received from the SIM from sending the other previous release version format at step 708, the mobile device identifies whether any further previous release version formats of the terminal profile exist (step 710). If no further previous release version formats of the terminal profile exist, the mobile device completes initialization and performs steady-state processing (step 712). Since there are no further version formats beyond version R97 that are necessary to process, the mobile device may invalidate the SIM at this point. If future specifications provide for an additional version(s) in the future, the method of FIG. 7 may be repeated further such that all possible version formats are tried.

The method associated with the flowchart of FIG. 8 is now described (SIM perspective). In FIG. 8, a SIM allows a mobile communication device to read its Elementary File (EF) Phase (step 802). If the terminal profile download is not required as indicated in the EF Phase at step 804, initialization is completed and steady-state processing is performed (step 816). If a terminal profile download is required as indicated in the EF Phase at step 804, the SIM receives a terminal profile of the mobile communication device in the latest release version format (step 806). This latest release version format of the terminal profile may be version R99 (e.g. FIG. 4). If the SIM supports this latest release version format at step 808, the SIM accepts and stores this terminal profile and initialization is completed, and steady-state processing is performed (step 816).

On the other hand, if the SIM does not support this latest release version format at step 808, the SIM rejects this terminal profile and sends an error response to the mobile device (step 810). If no previous release version formats of the terminal profile exist at step 812, initialization is completed and steady-state processing is performed (step 816). On the other hand, if a previous release version format of the terminal profile does exist at step 812, the SIM receives the terminal profile in the next latest release version format (step 806). The next latest release version format may be version R98 (e.g. FIG. 5). If the SIM supports this next latest release version format at step 808, the SIM accepts and stores this terminal profile and initialization is completed, and steady-state processing is performed (step 816).

On the other hand, if the SIM does not support this next latest release version format at step 808, the SIM rejects this terminal profile and sends an error response to the mobile device (step 810). If no previous release version formats of the terminal profile exist at step 812, initialization is completed and steady-state processing is performed (step 816). On the other hand, if yet another previous release version format of the terminal profile does exist at step 812, the SIM receives the terminal profile in the next latest release version format (step 806). The next latest release version format may be version R97 (e.g. FIG. 6). If the SIM supports this next latest release version format at step 808, the SIM accepts and stores this terminal profile and initialization is completed, and steady-state processing is performed (step 816). On the other hand, if the SIM does not support this next latest release version format at step 808, the SIM rejects this terminal profile and sends an error response to the mobile device (step 810). Since there are no version formats beyond version R97 that are necessary to process, the SIM may be invalidated by the mobile device at this point. If future specifications provide for an additional version(s) of the terminal profile, the method of FIG. 8 may be repeated further such that all possible version formats are tried.

Final Comments. What has been described are methods and apparatus for use in performing Subscriber Identity Module (SIM) initialization procedures. Methods and apparatus for performing a Subscriber Identity Module (SIM) initialization procedure are described. A terminal profile having a most recent release version format is communicated to a Subscriber Identity Module (SIM). An error from the SIM is detected in response to sending the most recent release version format of the terminal profile, since the SIM is incompatible with this most recent release version. Subsequently, a terminal profile having a previous release version format is communicated to the SIM based on detecting the error from the SIM. This may be repeated further until compatibility between the mobile communication device and the SIM is established.

The above-described embodiments of the present application are intended to be examples only. Those of skill in the art may effect alterations, modifications and variations to the particular embodiments without departing from the scope of the application. The invention described herein in the recited claims intend to cover and embrace all suitable changes in technology.

What is claimed is:

1. A method of performing a Subscriber Identify Module (SIM) initialization procedure by a mobile communication device, the method comprising: sending, to the SIM, a terminal profile having a first predetermined formatted characterized by a first profile length; detecting an error from the SIM in response to sending the terminal profile having the first predetermined format characterized by the first profile length; sending, to the SIM, a terminal profile having a second predetermined format characterized by a second profile length different from the first profile length in response to detecting the error from the SIM detecting another error from the SIM in response to sending the terminal profile having the second predetermined format characterized by the second profile length; and sending, to the SIM, a terminal profile having a third predetermined format characterized by a third profile length different from the first and the second profile lengths in response to detecting the other error from the SIM.

2. The method of claim 1, wherein the second predetermined format is based on communication standard version that precedes that of the first predetermined format.

3. The method of claim 1, wherein the first predetermined format is based on a most recent communication standard.

4. The method of claim 1, wherein the first predetermined format of the terminal profile is characterized by a first profile length of seventeen bytes and the second predetermined format of the terminal profile is characterized by a second profile length of nine bytes.

5. The method of claim 1, wherein the first predetermined format comprises a version R99 format of the terminal profile.

6. A mobile communication device, comprising: one or more processors; a wireless transceiver; a Subscriber Identity Module (SIM) interface coupled to the one or more processors; the one or more processors being operative to, as part of a SIM initialization procedure, send a terminal profile having a first predetermined formatted characterized by a first profile length through the SIM interface; the one or more processors being further operative to detect an through the SIM interface in response to sending the terminal profile having the first predetermined format characterized by the first profile length; the one or more processors being further operative to send a terminal profile having a second predetermined format characterized by a second profile length different from the first profile length through the SIM interface based on detecting an error the one or more processors being further operative to detect another error through the SIM interface in response to sending the terminal profile having the second predetermined format characterized by the second profile length; and the one or more processors being further operative to send a terminal profile having a third predetermined format characterized by a third profile length different from the first and the second profile lengths through the SIM interface based on detecting the other error.

7. The mobile communication device of claim 6, wherein the second predetermined format is based on communication standard version that precedes that of the first predetermined format.

8. The mobile communication device of claim 6, wherein the first predetermined format is based on a most recent communication standard.

9. The mobile communication device of claim 6, wherein the first predetermined format of the terminal profile is characterized by a first profile length of seventeen bytes and the second predetermined format of the terminal profile is characterized by a second profile length of nine bytes.

10. The mobile communication device of claim 6, wherein the second predetermined format comprises a version R98 or earlier format.

11. In a Subscriber Identity Module (SIM), a method for use in a SIM initialization procedure comprising; sending, from a mobile communication device, a terminal profile having a first predetermined formatted characterized by a first profile length; sending an error to the mobile communication device if the SIM is incompatible with the terminal profile having the first predetermined format characterized by the first profile length; in response to sending the error to the mobile communication device, receiving a terminal profile having a second predetermined format characterized by a second profile length different from the first profile length from the mobile communication device sending another error to the mobile communication device if the SIM is incompatible with the second predetermined format of the terminal profile; and in response to sending the other error to the mobile communication device, receiving a terminal profile having a third predetermined format characterized by a third profile length different form the first and the second profile lengths from the mobile communication device.

12. The method of claim 11, wherein the second predetermined format is based on communication standard version that precedes that of the first predetermined format.

13. The method of claim 11, wherein the first predetermined format is based on a most recent communication standard and the second predetermined format is based on a communication version that precedes that of the most recent communication standard.

14. The method of claim 11, wherein the first predetermined format of the terminal profile is characterized by a first profile length of seventeen bytes and the second predetermined format of the terminal profile is characterized by a second profile length of nine bytes.

15. The method of claim 11, wherein the second predetermined format comprises a version R98 or earlier format.

16. A Subscriber Identity Module (SIM), comprising: a card; one or more processors carried on the card; an interface for communicating with a mobile communication device; the interface coupled to the one or more processors; the one or more processors being operative to, as part of a SIM initialization procedure, receive a terminal profile having a first predetermined format characterized by a first profile length from a mobile communication device through the interface; the one or more processors being further operative to send an error to the mobile communication device through the interface if the SIM is incompatible with the terminal profile having the first predetermined format characterized by the first profile length; the one or more processors being further operative to receive a terminal profile having a second predetermined format characterized by a second profile length different from the first profile length from the mobile communication device through the interface in response to sending the error to the mobile communication device wherein the one or more processors being further operative to send another error to the mobile communication device if the SIM is incompatible with the second predetermined format of the terminal profile; and wherein the one or more processors being further operative to receive a terminal profile having a third predetermined format characterized by a third profile length different from the first and the second profile lengths from the mobile communication device in response to sending the other error to the mobile communication device.

17. The SIM of claim 16, wherein the second predetermined format is based on communication standard version that precedes that of the first predetermined format.

18. The SIM of claim 16, wherein the first predetermined format is based on a most recent communication standard.

19. The SIM of claim 16, wherein the first predetermined format of the terminal profile is characterized by a first profile length of seventeen bytes and the second predetermined format of the terminal profile is characterized by second profile length of nine bytes.

20. The SIM of claim 16, wherein the second predetermined format comprises a version R98 or earlier format.

* * * * *